United States Patent
Koganehira et al.

(10) Patent No.: US 7,537,652 B2
(45) Date of Patent: May 26, 2009

(54) INK COMPOSITION FOR INK JET RECORDING, RECORDING METHOD AND RECORDED MATTER

(75) Inventors: Shuichi Koganehira, Nagano-Ken (JP); Hironori Sato, Nagano-Ken (JP); Akira Mizutani, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/732,515

(22) Filed: Apr. 3, 2007

(65) Prior Publication Data

US 2007/0247504 A1    Oct. 25, 2007

(30) Foreign Application Priority Data

Apr. 4, 2006  (JP)  ............ 2006-103261

(51) Int. Cl.
  *C09D 11/02* (2006.01)
(52) U.S. Cl. .............. 106/31.58; 106/31.59; 106/31.86; 106/31.89
(58) Field of Classification Search .............. 106/31.58, 106/31.59, 31.86, 31.89; 347/100
  See application file for complete search history.

(56) References Cited

U.S. PATENT DOCUMENTS

| | | | | |
|---|---|---|---|---|
| 6,187,086 | B1 * | 2/2001 | Rehman | 106/31.86 |
| 6,436,180 | B1 * | 8/2002 | Ma et al. | 106/31.59 |
| 6,808,556 | B2 * | 10/2004 | Kelly-Rowley et al. | 106/31.58 |
| 6,890,378 | B2 * | 5/2005 | Yatake et al. | 106/31.59 |
| 7,052,536 | B2 * | 5/2006 | Yatake | 106/31.58 |
| 7,135,208 | B2 * | 11/2006 | Kubota | 106/31.86 |
| 7,307,109 | B2 * | 12/2007 | Yatake et al. | 523/160 |
| 2004/0024086 | A1 * | 2/2004 | Segawa et al. | 523/160 |
| 2004/0186200 | A1 * | 9/2004 | Yatake | 106/31.58 |
| 2005/0235870 | A1 * | 10/2005 | Ishihara | 106/31.58 |
| 2007/0091156 | A1 * | 4/2007 | Jackson | 106/31.58 |
| 2007/0266887 | A1 * | 11/2007 | Koganehira et al. | 106/31.86 |
| 2007/0282033 | A1 * | 12/2007 | Ito et al. | 523/160 |

FOREIGN PATENT DOCUMENTS

| | | |
|---|---|---|
| JP | 2001-072905 | 3/2001 |
| JP | 2003-012583 | 1/2003 |
| JP | 2003-306620 | 10/2003 |
| JP | 2004-210996 | 7/2004 |
| JP | 2005-194500 | 7/2005 |
| JP | 2005-263968 | 9/2005 |
| JP | 2005-263969 | 9/2005 |
| JP | 2005-263970 | 9/2005 |
| WO | 2007/116902 | 10/2007 |

OTHER PUBLICATIONS

Patent Abstracts of Japan and JPO computer English translation of JP 2005-194500 dated Jul. 21, 2005.
Patent Abstracts of Japan and JPO computer English translation of JP 2003-072905 dated Mar. 21, 2001.
Patent Abstracts of Japan and JPO computer English translation of JP 2003-012583 dated Jan. 15, 2003.
Patent Abstracts of Japan and JPO computer English translation of JP 2005-263970 dated Sep. 29, 2005.
English Abstracts of Japan of JP 2004-210996 dated Jul. 29, 2004.
English Abstracts of Japan of JP 2003-306620 dated Oct. 31, 2003.
English Abstracts of Japan of JP 2003-012583 dated Jan. 15, 2003.
English Abstracts of Japan of JP 2005-263968 dated Sep. 29, 2005.
English Abstracts of Japan of JP 2005-263969 dated Sep. 29, 2005.
English Abstracts of Japan of JP 2005-263970 dated Sep. 29, 2005.
Patent Abstracts of Japan of JP 2004-210996 dated Jul. 29, 2004.
Patent Abstracts of Japan of JP 2003-306620 dated Oct. 31, 2003.
Patent Abstracts of Japan of JP 2003-012583 dated Jan. 15, 2003.
Patent Abstracts of Japan of JP 2005-263968 dated Sep. 29, 2005.
Patent Abstracts of Japan of JP 2005-263969 dated Sep. 29, 2005.
Patent Abstracts of Japan of JP 2005-263970 dated Sep. 29, 2005.

* cited by examiner

*Primary Examiner*—Helene Klemanski
(74) *Attorney, Agent, or Firm*—Ladas and Parry LLP

(57) ABSTRACT

There is provided an ink composition for ink jet recording that, even on printing paper for running-on, can realize excellent gloss and good color reproduction and, at the same time, is excellent in ejection stability and recovery from clogging. The ink composition for ink jet recording comprises at least a colorant, water, an alkanediol, and a surfactant, wherein the alkanediol comprises a water soluble 1,2-alkanediol and a slightly water soluble 1,2-alkanediol, and the surfactant is a polyorganosiloxane.

15 Claims, No Drawings

INK COMPOSITION FOR INK JET RECORDING, RECORDING METHOD AND RECORDED MATTER

BACKGROUND OF THE INVENTION

1. Field of Invention

The present invention provides an ink composition for ink jet recording, which, even on various recording media, especially printing paper for running-on, can yield images having excellent gloss and color reproduction and, at the same time, can realize excellent ejection stability and recovery from clogging, and a method for ink jet recording using the ink composition.

2. Background Art

Ink jet recording is a printing method wherein droplets of an ink are ejected and deposited on recording media, such as paper, to perform printing. An innovative advance of a recent ink jet recording technique has made it possible to realize the production of images having quality comparable to images produced by silver salt photography or images yielded by high-definition printing realized only by offset printing. This trend has led to the development of inks for ink jet recording that can realize images having a high level of glossy impression comparable to the gloss of images produced by silver salt photography, using the so-called specialty papers which are recording media having a high level of gloss comparable to photographic paper, art paper and the like used in the field of silver salt photography and offset printing. Further, inks for ink jet recording which can realize image quality comparable to the image quality of images produced by silver salt photography even on plain paper, have also been developed.

Inks, which have been generally used for ink jet recording, are water-based inks that comprise water as a main component and a colorant and various additives. Regarding the colorant, the development of pigment-based inks utilizing the properties of the pigment has recently been forwarded because pigments are superior to dyes in weatherfastness properties such as lightfastness, gasfastness, waterfastness, and moisturefastness. For example, Japanese Patent Laid-Open No. 194500/2005 discloses a pigment-based ink composition having feathering- or bleeding-free properties and excellent gloss on specialty papers that have been realized by using a polysiloxane compound as a surfactant and adding an alkanediol such as 1,2-hexanediol as a solubilizer additive to the ink. Further, Japanese Patent Laid-Open Nos. 72905/2001 and 12583/2003 disclose an ink containing 1,2-hexanediol, which is a water soluble alkanediol, and 1,2-octanediol, which is a slightly water soluble alkanediol, as additives. The claimed advantage of this ink is feathering- or bleeding-free properties on plain papers. Further, Japanese Patent Laid-Open No. 263970/2005 discloses an ink composition comprising an acetylene glycol compound and a polysiloxane compound as surfactants and further 1,2-octanediol. The claimed advantage of this ink composition is to realize high print density on plain paper.

The widespread use of techniques for forming images from digital data in recent years has led to an increased need for digital color proofs (DTPs) particularly in the field of printing, and an ink jet recording method has also become applied to DTPs. The color reproduction and stability reproduction of printed matters are required of DTPs. Accordingly, when proofs are prepared by the ink jet recording method, specialty paper for ink jet recording has been generally used. In applications for color proof, however, ink jet recording on printing paper for running-on rather than specialty papers has been highly desired. Further, it is considered that proof cost can be significantly reduced if printed matter output directly on printing paper for running-on can be used as a final proof sample without use of any specialty paper. The printing paper for running-on is a coated paper having on its surface a coating layer for receiving an oil-based ink. In the printing paper for running-on, however, the capability of the coating layer to absorb ink is disadvantageously poor. Therefore, when water-based pigment inks, which have been generally used in ink jet recording, are used, the penetrability of the inks into recording media is so low that feathering or bleeding or uneven coagulation sometimes occurs in images.

When a high-penetration ink comprising the above polysiloxane surfactant and 1,2-hexanediol as a solubilizer for the polysiloxane surfactant is used from the viewpoint of solving the above problem, the feathering or bleeding problem can be reduced, but on the other hand, a problem of a difference in color reproduction between proofs and final printed matters and a problem of stable color reproduction sometimes take place.

SUMMARY OF THE INVENTION

The present inventors have now found that the addition of a combination of two specific alkanediols with a polyorganosiloxane compound as a surfactant to ink can realize an ink composition that, even on various recording media, especially on printing paper for running-on, can realize excellent gloss and good color reproduction, and, at the same time, is excellent in ejection stability and recovery from clogging. The present invention has been made based on such finding.

Accordingly, an object of the present invention is to provide an ink composition for ink jet recording that, even on various recording media, especially on printing paper for running-on, can realize excellent gloss and good color reproduction and, at the same time, is excellent in ejection stability and recovery from clogging.

According to the present invention, there is provided an ink composition for ink jet recording, comprising at least a colorant, water, an alkanediol, and a surfactant, wherein the alkanediol comprises a water soluble 1,2-alkanediol and a slightly water soluble 1,2-alkanediol and the surfactant is a polyorganosiloxane.

The present invention can realize an ink composition for ink jet recording that, even on various recording media, especially on printing paper for running-on, can realize excellent gloss and good color reproduction.

DETAILED DESCRIPTION OF THE INVENTION

The ink composition for ink jet recording according to the present invention comprises a colorant, water, an alkanediol, and a surfactant as indispensable ingredients. The alkanediol comprises two types of alkanediols, that is, a water soluble 1,2-alkanediol and a slightly water soluble 1,2-alkanediol. The surfactant is a polyorganosiloxane. The individual ingredients will be described.

<Alkanediol>

The alkanediol used in the ink composition for ink jet recording according to the present invention comprises at least two types of alkanediols of a water soluble 1,2-alkanediol and a slightly water soluble 1,2-alkanediol. The use of these two specific alkanediols in combination with a surfactant, which will be described later, is advantageous in that, even in the case of a recording medium covered on its surface with a resin, for example, printing paper for running-on, images having excellent gloss and good color reproduction can be realized. Further, also when the ink composition is applied to plain paper, the strike-through property can be improved and, thus, the ink composition according to the present invention is suitable for use in two-sided printing applications. The reason for this has not been fully elucidated yet but is believed to be as follows.

As described above, in conventional high-penetration inks for ink jet recording, the use of 1,2-hexanediol or 4-methyl-1,2-pentanediol is preferred from the viewpoint of lowering the surface tension of ink to reduce feathering or bleeding. In order to render the surface tension of the ink very low by adding only a water soluble 1,2-alkanediol such as 1,2-hexanediol, however, the addition of a large amount of the 1,2-alkanediol is necessary. For example, the surface tension of a 15 wt% aqueous solution of 1,2-hexanediol or 4-methyl-1,2-pentanediol is 25 to 26 mN/m. The addition of this substance increases the viscosity of the ink, and, thus, ink weight of dots is reduced. Accordingly, the ink weight of dots cannot be accurately regulated without difficulties. As a result, upon the ejection of ink from the head, unfavorable phenomena sometimes occur such as a shift in impact position of ink droplets, misting of ink, and poor print durability, often leading to lowered color development, deteriorated graininess, uneven coagulation and color-to-color bleeding which are causative of printing failure. On the other hand, the addition of only a slightly water soluble 1,2-alkanediol such as 1,2-octanediol is disadvantageous in that the separation of the slightly water soluble 1,2-alkanediol in the ink sometimes takes place particularly at a low temperature, resulting in a printing failure, and, in some cases, the storage stability at low temperatures and elevated temperatures is also poor. Further, as described in Japanese Patent Laid-Open No. 263970/2005, when an acetylene glycol surfactant is used in ink for dissolution, in some cases, the storage stability of the ink at elevated temperatures is poor.

Further, in ink jet recording, a transient penetration period exists in which, upon the deposition of ink droplets onto a recording medium, a surfactant is selectively and preferentially penetrated into a recording medium and, consequently, the relative amount of the surfactant in the ink droplets, which stay on the surface of the recording medium, becomes insufficient. It is considered that, in the transient penetration period, since the surface tension of the ink is rapidly increased, the ink cannot be satisfactorily penetrated into the recording medium and overflows resulting in coagulation spots formation and unsatisfactory drying. It is particularly considered that, when a conventional alkanediol-containing ink is applied to printing paper for running-on, due to a thin ink-receptive layer, the amount of ink absorbed into the recording medium is smaller than that in specialty paper for ink jet recording and, consequently, the ink weight (colorant amount)/inch/m$^2$ is smaller resulting in deteriorated color reproduction. In the present invention, by virtue of the addition of two specific alkanediols of a water soluble 1,2-alkanediol and a slightly water soluble 1,2-alkanediol, even in the transient penetration period where the relative amount of the surfactant is unsatisfactory, the rapid increase in surface tension can be suppressed, and, at the same time, by virtue of the incorporation of a lipophilic slightly water soluble alkanediol, the affinity of the ink for printing paper for running-on comprising an oleaginous coating layer can reduce overflow of ink caused by penetration failure, coagulation spots and drying failure.

Further, in an ink composition containing a large amount of a water soluble penetrating agent such as an water soluble 1,2-alkanediol, due to significant penetration into plain paper, the color development is sometimes poor. This problem can be solved by properly emulsification-dissolving or fully dissolving oily matter such as a slightly water soluble 1,2-alkanediol with the aid of a water soluble penetrating agent such as water soluble 1,2-alkanediol to prevent a deterioration in color development. The reason why this means can solve the color development deterioration problem is believed to reside in that the slightly water soluble 1,2-alkanediol as oily matter is selectively and preferentially penetrated into a fibrous material constituting the plain paper to swell the fibrous material and thus to prevent the penetration of the colorant pigment dispersed in the water soluble ingredient into between fiber layers.

In the present invention, the water soluble 1,2-alkanediol is preferably an optionally branched 1,2-alkanediol having 5 or 6 carbon atoms, and examples thereof include 4-methyl-1,2-pentanediol, 1,2-pentanediol, 3,3-dimethyl-1,2-butanediol, and 1,2-hexanediol. Among them, 1,2-hexanediol and/or 4-methyl-1,2-pentanediol are particularly preferred.

The content of the water soluble 1,2-alkanediol is preferably not less than 3% by weight based on the whole ink composition, more preferably 3 to 15% by weight. When the content of the water soluble 1,2-alkanediol is in the above-defined range, the separation of the slightly water soluble 1,2-alkanediol can be suppressed and, consequently, stable ejection can be realized.

The slightly water soluble 1,2-alkanediol preferably comprises an optionally branched 1,2-alkanediol having 8 or more carbon atoms. Preferred are 4,4-dimethyl-1,2-pentanediol, 5-methyl-1,2-hexanediol, 1,2-heptanediol, and 1,2-octanediol. Among them, 1,2-octanediol is particularly preferred.

The content of the slightly water soluble 1,2-alkanediol is preferably 0.3 to 15.0% by weight, more preferably 0.3 to 3.0% by weight, based on the whole ink composition. When the content of the slightly water soluble 1,2-alkanediol is in the above-defined range, the separation of the slightly water soluble 1,2-alkanediol can be suppressed and, consequently, stable ejection can be realized. Further, the surface tension of the ink can be brought to a very low value even when the content of the water soluble 1,2-alkanediol does not exceed 15% by weight. Thus, the addition of the slightly water soluble 1,2-alkanediol in the above-defined content range is effective for viscosity lowering, coagulation suppression, and storage stability. For example, the surface tension of an aqueous solution containing 7% by weight of 4-methyl-1,2-pentanediol and 3% by weight of 1,2-octanediol is not more than 25 mN/m.

In the present invention, the content ratio of the water soluble 1,2-alkanediol to the slightly water soluble 1,2-alkanediol is preferably 10:1 to 1:1 on a weight basis. This mixing ratio can suppress the separation of the slightly water soluble 1,2-alkanediol and, thus, stable ejection can be realized, and the occurrence of strike-through and/or coagulation spots can be further reduced.

Further, in the present invention, the ink composition may contain, as a penetration solvent, 1,2-alkanediols having 5 to 10 carbon atoms and/or lactams and/or lactones, to which a polyoxyethylene chain and/or a polypropylene chain have been added.

<Surfactant>

The ink composition for ink jet recording according to the present invention contains a surfactant as an indispensable ingredient. When the recording medium used has on its surface a resin coating receptive to ink, the use of a surfactant in the ink composition for ink jet recording can realize images having excellent gloss even on recording media, in which greater importance is attached to a glossy impression, for example, photographic paper. Even when a recording medium comprising a surface receptive layer provided with a coating layer for receiving an oil-based ink, for example, printing paper for running-on, is used, color-to-color bleeding can be prevented and, at the same time, reflected light-derived whitening caused by increasing the deposition amount of the ink can be prevented.

In the present invention, organopolysiloxane surfactants are used as the surfactant. The use of the organopolysiloxane surfactant is advantageous in that, since the above specific two alkanediols are contained, the solubility of the surfactant in the ink is improved to suppress the occurrence of insolubles and the like, whereby an ink composition having better ejection stability can be realized.

More preferably, the ink composition contains one or at least two compounds represented by formula as the organopolysiloxane surfactant:

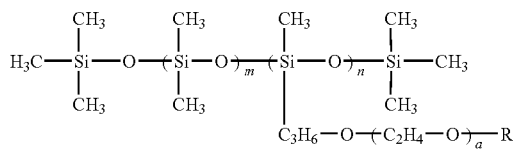

wherein R represents a hydrogen atom or a methyl group; a is an integer of 7 to 11; m is an integer of 20 to 70; and n is an integer of 2 to 5. When such specific organopolysiloxane surfactants are used, uneven coagulation of the ink can be further improved.

In another preferred embodiment of the present invention, one or at least two compounds represented by the above formula, wherein R represents a hydrogen atom or a methyl group, a is an integer of 2 to 5, m is an integer of 20 to 70, and n is an integer of 2 to 4, may be contained as the polysiloxane compound.

When the above polyorganosiloxane compounds are contained, preferably, a polysiloxane compound represented by the above formula, wherein R represents a hydrogen atom or a methyl group; a is an integer of 9 to 13; m is an integer of 2 to 4; and n is 1 or 2, is further contained as the surfactant. The combined use of this polysiloxane compound can realize further improved unevenness of ink coagulation.

The reason why the incorporation of the above specific polyorganosiloxane compounds can improve the unevenness of ink coagulation, is considered as follows. Specifically, for example, in an aqueous solution comprising 20% by weight of glycerin (glycerol), 10% by weight of 1,2-hexanediol, and 0.1% by weight of the above surfactant, the surface tension of the aqueous solution at 1 Hz is not more than 25 mN/m. That is, the incorporation of the above surfactant can realize a very low surface tension of the glycol-containing aqueous solution. When Surfynol 465, which is an acetylene glycol surfactant, is brought to an aqueous solution having the same composition as described above, the surface tension of the aqueous solution is not less than 25 mN/m.

Such surfactants may be commercially available products, and examples thereof include KF-954A, KF-353A, KF6017, X-22-6551 and AW-3 (all the above products being manufactured by The Shin-Etsu Chemical Co., Ltd.).

The content of the surfactant in the ink composition according to the present invention is preferably 0.01 to 2.00% by weight, more preferably 0.05 to 0.50% by weight. In particular, when the surfactant wherein R represents a methyl group is used, preferably, the content of the surfactant is larger than the case where the surfactant wherein R represents H is used.

Other surfactants, specifically fluorosurfactants, acetylene glycol surfactants, anionic surfactants, nonionic surfactants, amphoteric surfactants and the like, may be further added to the ink composition according to the present invention.

Examples of acetylene glycol surfactants among these other surfactants include 2,4,7,9-tetramethyl-5-decyne-4,7-diol, 3,6-dimethyl-4-octyne-3,6-diol, 3,5-dimethyl-1-hexyn-3-ol, or 2,4-dimethyl-5-hexyn-3-ol. Acetylene glycol surfactants may also be commercially available products. Examples thereof include Olfine E1010, Olfine STG, or Olfine Y (tradename, manufactured by Nissin Chemical Industry Co., Ltd.) and Surfynol 61, Surfynol 104, Surfynol 82, Surfynol 465, Surfynol 485 or Surfynol TG (tradename, manufactured by Air Products and Chemicals Inc.).

Further, 1,2-alkanediols having 5 to 10 carbon atoms and/or lactams and/or lactones, to which a polyoxyethylene chain and/or a polypropylene chain have been added, may also be contained as the penetration solvent.

<Colorant>

Any of dyes and pigments may be used as the colorant in the ink composition for ink jet recording according to the present invention. However, pigments are preferred from the viewpoints of lightfastness and waterfastness.

Inorganic pigments and organic pigments are usable as the pigment. The inorganic pigments and the organic pigments may be used either solely or as a mixture of two or more. Inorganic pigments include, for example, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline blacks.

Pigments used may be properly selected depending upon the type (color) of the ink composition to be prepared using the pigment dispersion liquid according to the present invention. Examples of pigments for yellow ink compositions include C.I. Pigment Yellow 1, C.I. Pigment Yellow 2, C.I. Pigment Yellow 3, C.I. Pigment Yellow 12, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. They may be used either solely or in a combination of two or more. The use of one or at least two pigments selected from the group consisting of C.I. Pigment Yellow 74, C.I. Pigment Yellow 110, C.I. Pigment Yellow 128, and C.I. Pigment Yellow 147 is particularly preferred. Examples of pigments for magenta ink compositions include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, and C.I. Pigment Violet 19. They may be used either solely or in a combination of two or more. The use of one or at least two pigments selected from the group consisting of C.I. Pigment Red 122, C.I. Pigment Red 202, C.I. Pigment Red 209, and C.I. Pigment Violet 19 is particularly preferred. Examples of pigments for cyan ink compositions include C.I. Pigment Blue 1, C.I. Pigment Blue 2, C.I. Pigment Blue 3, C.I. Pigment Blue 15:2, C.I. Pigment Blue 15:3, C.I. Pigment Blue 15:4, C.I. Pigment Blue 15:34, C.I. Pigment Blue 16, C.I. Pigment Blue 22, and C.I. Pigment Blue 60; and C.I. Vat Blue 4 and C.I. Vat Blue 60. They may be used either solely or in a combination of two or more. The use of C.I. Pigment Blue 15:3 and/or C.I. Pigment Blue 15:4 is particularly preferred. C.I. Pigment Blue 15:3 is still more preferred. Examples of pigments for black ink compositions include inorganic pigments, for example, carbon blacks (C.I. Pigment Black 7) such as furnace black, lamp black, acetylene black, and channel black and iron oxide pigments; and organic pigments, for example, aniline black (C.I. Pigment Black 1).

In the present invention, preferably, the pigment is one which has been kneaded with a dispersant which will be described later. However, pigments not subjected to surface treatment can also form excellent color images.

<Dispersant>

The ink composition according to the present invention preferably comprises a copolymer resin of a hydrophobic monomer and a hydrophilic monomer as a dispersant for dispersing a colorant. The copolymer resin is adsorbed to a pigment to improve the dispersibility of the pigment.

Specific examples of hydrophobic monomers include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimetylolpropane triacrylate, trimetylolpropane trimethacrylate, glycerol acrylate, glycerol methacrylate, styrene, methylstyrene, and vinyltoluene. They may be used either solely or as a mixture of two or more.

Specific examples of hydrophilic monomers include acrylic acid, methacrylic acid, maleic acid, and itaconic acid.

The copolymer resin of a hydrophobic monomer and a hydrophilic monomer is preferably at least any one of styrene-(meth) acrylic acid copolymer resins, styrene-methylstyrene-(meth)acrylic acid copolymer resins, styrene-maleic acid copolymer resins, (meth)acrylic acid-(meth)acrylic ester copolymer resins, and styrene-(meth)acrylic acid-(meth) acrylic ester copolymer resins, from the viewpoints of simultaneously satisfying color image gloss, bronzing prevention, and ink composition storage stability requirements and, at the same time, forming color images having better gloss.

The copolymer resin may be a resin (styrene-acrylic acid resin) comprising a polymer produced by reacting styrene with acrylic acid or an acrylic ester. Alternatively, the copolymer resin may be an acrylic acid-type water soluble resin. Alternatively, salts thereof, for example, sodium, potassium, or ammonium salts thereof, may also be used.

The content of the copolymer resin is preferably 10 to 50 parts by weight, more preferably 10 to 35 parts by weight, based on 100 parts by weight of the pigment, from the viewpoints of simultaneously satisfying color image gloss, bronzing prevention, and ink composition storage stability requirements and, at the same time, forming color images having better gloss.

Examples of surfactants which are preferred as dispersants include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants such as fatty acid amine salts, quaternary ammonium salts, sulfonium salts, and phosphoniums; and nonionic surfactants such as polyoxyethylene alkyl ethers, polyoxyethylene alkyl esters, sorbitan alkyl esters, and polyoxyethylene sorbitan alkyl esters. It is needless to say that the above surfactants, when added to the ink composition, can function also as a surfactant. In this case, however, the surfactant should be added so that the contact angle of the recording medium with the ink composition falls within the above defined range.

<Water and Other Ingredients>

The ink composition for ink jet recording according to the present invention comprises the above specific solvent and surfactant, other various additives and further contains water as a solvent. Water is preferably pure water obtained by ion exchange, ultrafiltration, reverse osmosis, distillation or the like, or ultrapure water. These waters, which have been sterilized, for example, by ultraviolet irradiation or by addition of hydrogen peroxide, are particularly preferred because they can prevent the growth of mold or bacteria in the ink composition for a long period of time.

The ink composition for ink jet recording according to the present invention may further comprise an organic amine. The organic amine can enhance the capability of wetting a recording face in a recording medium or the like in the formation of a recorded image to enhance the ink penetration. Further, when the organic amine is contained, pH of the ink composition can easily be adjusted to a suitable range. The organic amine is preferably a tertiary amine.

For example, alkanolamines such as triethanolamine may be mentioned as the tertiary amine. The pH value of the ink composition according to the present invention is preferably 8 to 12, particularly preferably 8 to 10. When the pH value is in the above-defined range, a deterioration in members in contact with the ink can be prevented.

The content of the organic amine in the total weight of the ink composition is not less than 0.1% by weight. In this case, the capability of the ink composition to wet a recording face, for example, in a recording medium in recorded image formation can be enhanced to enhance ink penetration. From the viewpoints of the ejection stability, storage stability, and high speed printing of the ink, the content of the organic amine is preferably 0.1 to 8.0% by weight, more preferably 0.5 to 5.0% by weight, still more preferably 1.0 to 3.0% by weight.

Further, the ink composition according to the present invention preferably comprises a penetrating agent in addition to the above ingredients.

Glycol ethers are suitable as the penetrating agent.

Specific examples of glycol ethers usable herein include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used either solely or as a mixture of two or more.

Among the above glycol ethers, alkyl ethers of polyhydric alcohols are preferred. Particularly preferred are ethylene glycol monoethyl ether, ethylene glycol mono-n-butyl ether, diethylene glycol monomethyl ether, diethylene glycol monoethyl ether, diethylene glycol mono-n-butyl ether, triethylene glycol monomethyl ether, triethylene glycol monoethyl ether, or triethylene glycol mono-n-butyl ether. More preferred are triethylene glycol mono-n-butyl ether.

The addition amount of the penetrating agent may be properly determined but is preferably about 0.1 to 30% by weight, more preferably about 1 to 20% by weight.

Preferably, the ink composition according to the present invention further comprises a solubilizer for a recording medium in addition to the above ingredients.

Pyrrolidones such as N-methyl-2-pyrrolidone and/or lactones such as y-butyrolactone are suitable as a solubilizer for a recording medium. The addition amount of the solubilizer for a recording medium may be properly determined but is preferably about 0.1 to 30% by weight, more preferably about 1 to 20% by weight.

Preferably, the ink composition for ink jet recording according to the present invention comprises a wetting agent. Polyhydric alcohols and/or saccharides are suitable as the wetting agent. Specific examples of polyhydric alcohols include glycerin, ethylene glycol, diethylene glycol, triethylene glycol, and trimetylolpropane. Specific examples of saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. Here the term "polysaccharide" used herein means saccharides in the broad sense as including substances which exist widely in the world of nature, such as alginic acid, α-cyclodextrin and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thio-sugars. Sugar alcohols are particularly preferred, and specific examples thereof include maltitol, sorbitol, and xylitol. Further, commercially available products such as HS-500 (manufactured by HAYASHIBARA SHOJI, INC.) are also suitable. Hyaluronates may be products commercially available as a 1% aqueous solution of sodium hyaluronate (molecular weight 350000). Trimethylolpropane and 1,2,6-hexatriol are also suitable.

The addition amount of the wetting agent may be properly determined but is preferably 0.1 to 30% by weight, more preferably about 1 to 20% by weight, still more preferably 6 to 16% by weight. It would be apparent to a person having ordinary skill in the art that a part of the penetration solvent functions also as a wetting agent.

If necessary, other additives, for example, nozzle clogging preventives, preservatives, antioxidants, electric conductivity adjustors, pH adjustors, viscosity modifiers, surface tension modifiers, and oxygen absorbers, may be added to the ink composition according to the present invention.

For example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BND, Proxel GXL, Proxel XL-2, and Proxel TN, manufactured by ICI) may be used as preservatives and antimolds.

Examples of pH adjustors, solubilizers, or antioxidants usable herein include: amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxides such as tetramethylammonium; salts of carbonic acid such as potassium carbonate, sodium carbonate, and lithium carbonate; salts of phosphoric acid, such as potassium phosphate, sodium phosphate, and lithium phosphate; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof.

The ink composition according to the present invention may contain an additional antioxidant and an ultraviolet absorber, and examples thereof include: Tinuvin 328, Tinuvin 900, Tinuvin 1130, Tinuvin 384, Tinuvin 292, Tinuvin 123, Tinuvin 144, Tinuvin 622 and Tinuvin 770 manufactured by Ciba Specialty Chemicals, K.K.; Irgacor 252 and Irgacor 153; Irganox 1010, Irganox 1076, and Irganox 1035; MD 1024; and lanthanide oxides.

The ink composition according to the present invention can be produced by dispersing and mixing the above ingredients by a suitable method. Preferably, an ink solution is prepared by first mixing the pigment, the polymeric dispersant, and water together by a suitable dispergator, for example, a ball mill, a sand mill, an attritor, a roll mill, an agitator mill, a Henschel mixer, a colloid mill, an ultrasonic homogenizer, a jet mill, or an angmill to prepare a homogeneous pigment dispersion liquid, then adding, for example, separately prepared resins (resin emulsion), water, water soluble organic solvents, saccharides, pH adjustors, preservatives and antimolds, and satisfactorily dissolving the components. After the satisfactory stirring, the mixture is filtered for the removal of coarse particles and foreign matter causative of clogging to prepare a contemplated ink composition.

Method for Ink Jet Recording

The method for ink jet recording according to the present invention comprises ejecting droplets of the ink composition and depositing the droplets onto a recording medium to perform printing. In this method, the ejected ink droplets are deposited onto the recording medium so that dots are superimposed on top of each other. In the recording method according to the present invention, preferably, printing paper for running-on is used as the recording medium. Even when the specific recording medium is used, images possessing excellent glossiness and good color reproduction can be realized.

Further, in the method for ink jet recording according to the present invention, preferably, droplets of the ink composition are ejected so that dots in a vertical direction are alternately arranged relative to a scanning direction of the recording head. In the formation of dots in this checked pattern, when the ink composition of the present invention is used, uneven coagulation can be significantly improved as compared with the conventional ink composition.

EXAMPLES

The following Examples further illustrate the present invention. However, it should be noted that the present invention is not limited to these Examples.

<Preparation of Ink Compositions>

Ingredients were mixed together according to the formulations shown in Table 1, and the mixtures were filtered through a 10-μm membrane filter to prepare inks.

TABLE 1

| Composition | | Example 1 Ink set 1 | | | | Example 2 Ink set 2 | | | | Example 3 Ink set 3 | |
|---|---|---|---|---|---|---|---|---|---|---|---|
| | | 1Y | 1M | 1C | 1B | 2Y | 2M | 2C | 2B | 3Y | 3M |
| Colorant | C.I. Pigment Yellow 74 | 5.0 | — | — | — | 5.0 | — | — | — | 5.0 | — |
| | C.I. Pigment Red 122 | — | 5.0 | — | — | — | 5.0 | — | — | — | 5.0 |
| | C.I. Pigment Blue 15:4 | — | — | 5.0 | — | — | — | 5.0 | — | — | — |
| | C.I. Pigment Black 7 | — | — | — | 5.0 | — | — | — | 5.0 | — | — |
| | Styrene-acrylic resin | 2.0 | 2.0 | 2.0 | 2.0 | 2.0 | 2.0 | 2.0 | 2.0 | 2.0 | 2.0 |
| Alkanediol | 4-Methyl-1,2-pentanediol | 5.0 | 5.0 | 5.0 | 5.0 | 3.0 | 3.0 | 3.0 | 3.0 | 7.0 | 7.0 |
| | 1,2-Hexanediol | — | — | — | — | — | — | — | — | — | — |
| | 1,2-Octanediol | 0.5 | 0.5 | 0.5 | 0.5 | 3.0 | 3.0 | 3.0 | 3.0 | 3.0 | 3.0 |
| Surfactant | Polysiloxane surfactant (note 1) | 0.1 | 0.1 | 0.1 | 0.1 | 0.1 | 0.1 | 0.1 | 0.1 | 0.1 | 0.1 |
| | Triethanolamine | 0.9 | 0.9 | 0.9 | 0.9 | 0.9 | 0.9 | 0.9 | 0.9 | 0.9 | 0.9 |
| | Glycerin | 16.0 | 16.0 | 16.0 | 16.0 | 16.0 | 16.0 | 16.0 | 16.0 | 16.0 | 16.0 |
| | Pure water | Balance | Balance | Balance | Balance | Balance | Balance | Balance | Balance | Balance | Balance |
| Total | | 100 | 100 | 100 | 100 | 100 | 100 | 100 | 100 | 100 | 100 |

| Composition | | Example 3 Ink set 3 | | Example 4 Ink set 4 | | | | Example 5 Ink set 5 | | | |
|---|---|---|---|---|---|---|---|---|---|---|---|
| | | 3C | 3B | 4Y | 4M | 4C | 4B | 5Y | 5M | 5C | 5B |
| Colorant | C.I. Pigment Yellow 74 | — | — | 5.0 | — | — | — | 5.0 | — | — | — |
| | C.I. Pigment Red 122 | — | — | — | 5.0 | — | — | — | 5.0 | — | — |
| | C.I. Pigment Blue 15:4 | 5.0 | — | — | — | 5.0 | — | — | — | 5.0 | — |
| | C.I. Pigment Black 7 | — | 5.0 | — | — | — | 5.0 | — | — | — | 5.0 |
| | Styrene-acrylic resin | 2.0 | 2.0 | 2.0 | 2.0 | 2.0 | 2.0 | 2.0 | 2.0 | 2.0 | 2.0 |

TABLE 1-continued

| | | | | | | | | | | | |
|---|---|---|---|---|---|---|---|---|---|---|---|
| Alkanediol | 4-Methyl-1,2-pentanediol | 7.0 | 7.0 | 9.0 | 9.0 | 9.0 | 9.0 | 9.0 | 9.0 | 9.0 | 9.0 |
| | 1,2-Hexanediol | — | — | — | — | — | — | 6.0 | 6.0 | 6.0 | 6.0 |
| | 1,2-Octanediol | 3.0 | 3.0 | 0.9 | 0.9 | 0.9 | 0.9 | 1.5 | 1.5 | 1.5 | 1.5 |
| Surfactant | Polysiloxane surfactant (note 1) | 0.1 | 0.1 | 0.1 | 0.1 | 0.1 | 0.1 | 0.1 | 0.1 | 0.1 | 0.1 |
| | Triethanolamine | 0.9 | 0.9 | 0.9 | 0.9 | 0.9 | 0.9 | 0.9 | 0.9 | 0.9 | 0.9 |
| | Glycerin | 16.0 | 16.0 | 16.0 | 16.0 | 16.0 | 16.0 | 8.0 | 8.0 | 8.0 | 8.0 |
| | Pure water | Balance | Balance | Balance | Balance | Balance | Balance | Balance | Balance | Balance | Balance |
| | Total | 100 | 100 | 100 | 100 | 100 | 100 | 100 | 100 | 100 | 100 |

| | | Comparative Example 1 Ink set 6 | | | | Comparative Example 2 Ink set 7 | | | | Comparative Example 3 Ink set 8 | |
|---|---|---|---|---|---|---|---|---|---|---|---|
| | Composition | 1Y | 1M | 1C | 1B | 1Y | 1M | 1C | 1B | 1Y | 1M |
| Colorant | C.I. Pigment Yellow 74 | 5.0 | — | — | — | 5.0 | — | — | — | 5.0 | — |
| | C.I. Pigment Red 122 | — | 5.0 | — | — | — | 5.0 | — | — | — | 5.0 |
| | C.I. Pigment Blue 15:4 | — | — | 5.0 | — | — | — | 5.0 | — | — | — |
| | C.I. Pigment Black 7 | — | — | — | 5.0 | — | — | — | 5.0 | — | — |
| | Styrene-acrylic resin | 2.0 | 2.0 | 2.0 | 2.0 | 2.0 | 2.0 | 2.0 | 2.0 | .0 | 2.0 |
| Alkanediol | 4-Methyl-1,2-pentanediol | 3.0 | 3.0 | 3.0 | 3.0 | 3.0 | 3.0 | 3.0 | 3.0 | 9.0 | 9.0 |
| | 1,2-Hexanediol | — | — | — | — | — | — | — | — | — | — |
| | 1,2-Octanediol | — | — | — | — | 3.0 | 3.0 | 3.0 | 3.0 | — | — |
| Surfactant | Surfynol 465 | 0.1 | 0.1 | 0.1 | 0.1 | 0.1 | 0.1 | 0.1 | 0.1 | 0.1 | 0.1 |
| | Triethanolamine | 0.9 | 0.9 | 0.9 | 0.9 | 0.9 | 0.9 | 0.9 | 0.9 | 0.9 | 0.9 |
| | Glycerin | 16.0 | 16.0 | 16.0 | 16.0 | 16.0 | 16.0 | 16.0 | 16.0 | 16.0 | 16.0 |
| | Pure water | Balance | Balance | Balance | Balance | Balance | Balance | Balance | Balance | Balance | Balance |
| | Total | 100 | 100 | 100 | 100 | 100 | 100 | 100 | 100 | 100 | 100 |

| | | | Comparative Example 3 Ink set 8 | | Comparative Example 4 Ink set 9 | | | |
|---|---|---|---|---|---|---|---|---|
| | | Composition | 1C | 1B | 1Y | 1M | 1C | 1B |
| | Colorant | C.I. Pigment Yellow 74 | — | — | 5.0 | — | — | — |
| | | C.I. Pigment Red 122 | — | — | — | 5.0 | — | — |
| | | C.I. Pigment Blue 15:4 | 5.0 | — | — | — | 5.0 | — |
| | | C.I. Pigment Black 7 | — | 5.0 | — | — | — | 5.0 |
| | | Styrene-acrylic resin | 2.0 | 2.0 | 2.0 | 2.0 | 2.0 | 2.0 |
| | Alkanediol | 4-Methyl-1,2-pentanediol | 9.0 | 9.0 | 9.0 | 9.0 | 9.0 | 9.0 |
| | | 1,2-Hexanediol | — | — | — | — | — | — |
| | | 1,2-Octanediol | — | — | 0.9 | 0.9 | 0.9 | 0.9 |

TABLE 1-continued

| | | | | | | | |
|---|---|---|---|---|---|---|---|
| Surfactant | Surfynol 465 | 0.1 | 0.1 | 0.1 | 0.1 | 0.1 | 0.1 |
| | Triethanolamine | 0.9 | 0.9 | 0.9 | 0.9 | 0.9 | 0.9 |
| | Glycerin | 16.0 | 16.0 | 16.0 | 16.0 | 16.0 | 16.0 |
| | Pure water | Balance | Balance | Balance | Balance | Balance | Balance |
| | Total | 100 | 100 | 100 | 100 | 100 | 100 |

Note 1:
The polysiloxane surfactant is AW-3: X-22-6551 = 9:1.

In the table, the styrene-acrylic acid resin is a copolymer having a molecular weight of 1600 and an acid value of 150.

<Evaluation>

Ejection Stability

An ink jet printer (PX-G900 manufactured by Seiko Epson Corporation) was provided. "Shashin Yoshi Suisho, Kirei Modo (Photographic Paper Recommended, Fine Mode)" was selected, and, for each of the inks prepared above, a full density blotted image and a line pattern were continuously printed at 5° C. (low temperature). Thereafter, ink dot missing and ink droplet trajectory directionality problem in 1000 printed sheets were observed and were evaluated according to the following criteria.

A: The number of lines suffering from dot missing and/or ink droplet trajectory directionality problem was zero (0).

B: The number of lines suffering from dot missing and/or ink droplet trajectory directionality problem was 10 or less.

C: The number of lines suffering from dot missing and/or ink droplet trajectory directionality problem was more than 10.

The results of evaluation were as shown in Table 2 below.

Recovery From Clogging

The ink jet printer as used above was provided. Each ink was loaded into the head. After normal ejection of the ink through all nozzles was confirmed, in order to accelerate drying in nozzles, the ink cartridge was removed, and the recording head was removed from the head cap, followed by standing in this state under an environment of 40° C. and 20% RH for one week.

After the one-week standing, cleaning operation was repeated to determine the number of cleaning operations required for all the nozzles to normally eject the ink as in the initial state. The recovery from nozzle clogging was evaluated according to the following criteria.

A: Recovered to substantially the initial state by performing the cleaning operation three times or less.

B: Recovered to substantially the initial state by performing the cleaning operation six times or less.

C: Recovered to substantially the initial state by performing the cleaning operation six times, then allowing the nozzles to stand for 6 hr, and then further performing the cleaning operation once.

The results of evaluation were as shown in Table 2 below.

Color Development

Ink set 1 was loaded into an ink cartridge in the same ink jet printer as described above. "Futsushi Suisho, Kirei Modo (Plain Paper Recommended, Fine Mode)" was selected, and a full density blotted image was printed on Xerox 4024 (manufactured by Xerox Corp.) with a resolution of 720×720 dpi under setting of "Without Gloss Optimizer." The printed matter was allowed to stand at 25° C. for 24 hr. The OD value of the recorded face was measured with SPM50 manufactured by Gretag Macbeth. The image color development was evaluated according to the following criteria.

A: OD value of not less than 1.2

B: OD value of not less than 1.1 and less than 1.2

C: OD value of less than 1.1

Ink sets 2 to 9 were also evaluated for color reproducibility in the same manner as described just above. The results of evaluation were as shown in Table 2.

Strike-through

Ink set 1 was loaded into an ink cartridge in the same ink jet printer as described above. "Shashin Yoshi Suisho, Kirei Modo (Photographic Paper Recommended, Fine Mode)" was selected, and a full density blotted image was printed on Xerox 4024 (manufactured by Xerox Corp.) with a resolution of 1440×720 dpi under setting of "Without Gloss Optimizer." The printed matter was allowed to stand at 25° C. for 24 hr. The OD value of the backside of the recorded face was measured with SPM50 manufactured by Gretag Macbeth. The level of the strike-through was evaluated according to the following criteria.

A: OD value of less than 0.06

B: OD value of not less than 0.06

Ink sets 2 to 9 were also evaluated for strike-through in the same manner as described just above. The results of evaluation were as shown in Table 2.

Uneven Ink Coagulation

Ink set 1 among the inks prepared above was loaded into an ink cartridge in the same ink jet printer as used above, and printing was carried out on OK Top Coat+ (manufactured by Oji Paper Co., Ltd.) as printing paper for running-on with a resolution of 1440×1440 dpi. In this case, regarding printing conditions, the discharge rate of the ink was regulated so that, in a method for recording in a single directions, a resolution of 720×180 dpi is provided by one drive of the recording head, the dot weight was 7 ng. The drive head was 200 cps.

The recorded matters thus obtained were evaluated for unevenness of ink coagulation according to the following criteria.

AA: No uneven coagulation was observed even with an ink weight of 5.2 mg/inch$^2$.

A: No uneven coagulation was observed with an ink weight of 4.4 mg/inch$^2$, but on the other hand, uneven coagulation was observed with an ink weight of 5.2 mg/inch$^2$.

B: No uneven coagulation was observed with an ink weight of 3.6 mg/inch$^2$, but on the other hand, uneven coagulation was observed with an ink weight of 4.4 mg/inch$^2$.

C: Uneven coagulation was observed even with an ink weight of 3.6 mg/inch$^2$.

Ink sets 2 to 9 were also evaluated for uneven coagulation in the same manner as described above. The results were as shown in Table 2.

TABLE 2

|  | Ejection stability | Anti-clogging property | Color development | Strike-through | Unevenness of ink coagulation |
|---|---|---|---|---|---|
| Example 1 | A | A | B | B | B |
| Example 2 | B | B | A | A | A |
| Example 3 | A | A | A | A | AA |
| Example 4 | A | A | B | B | AA |
| Example 5 | A | A | B | B | AA |
| Comparative Example 1 | A | C | C | B | C |
| Comparative Example 2 | C | B | B | A | C |
| Comparative Example 3 | A | C | C | B | C |
| Comparative Example 4 | B | B | B | B | C |

What is claimed is:

1. An ink composition for ink jet recording, comprising at least a colorant, water, an alkanediol, and a surfactant, wherein
the alkanediol comprises a water soluble 1,2-alkanediol and a slightly water soluble 1,2-alkanediol and
the surfactant is a polyorganosiloxane.

2. The ink composition for ink jet recording according to claim 1, wherein the water soluble 1,2-alkanediol is an optionally branched 1,2-alkanediol having 5 or 6 carbon atoms.

3. The ink composition for ink jet recording according to claim 2, wherein the water soluble 1,2-alkanediol is 1,2-hexanediol and/or 4-methyl-1,2-pentanediol.

4. The ink composition for ink jet recording according to claim 1, wherein the slightly water soluble 1,2-alkanediol is an optionally branched 1,2-alkanediol having 8 or more carbon atoms.

5. The ink composition for ink jet recording according to claim 4, wherein the slightly water soluble 1,2-alkanediol is 1,2-octanediol.

6. The ink composition for ink jet recording according to claim 1, wherein the polyorganosiloxane comprises one or at least two compounds represented by the following formula:

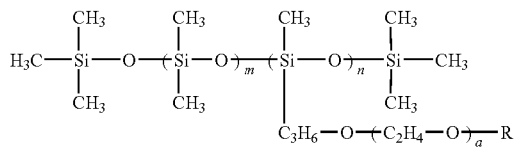

wherein R represents a hydrogen atom or a methyl group; a is an integer of 7 to 11; m is an integer of 20 to 70; and n is an integer of 2 to 5.

7. The ink composition for ink jet recording according to claim 1, wherein said polyorganosiloxane comprises one or at least two compounds represented by the following formula:

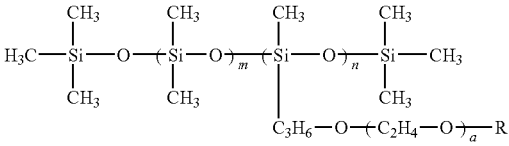

wherein R represents a hydrogen atom or a methyl group; a is an integer of 2 to 5; m is an integer of 20 to 70; and n is an integer of 2 to 4.

8. The ink composition for ink jet recording according to claim 6, wherein the surfactant further comprises a polyorganosiloxane represented by the following formula:

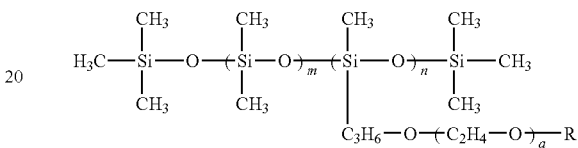

wherein R represents a hydrogen atom or a methyl group; a is an integer of 9 to 13; m is an integer of 2 to 4; and n is an integer of 1 or 2.

9. The ink composition for ink jet recording according to claim 1, wherein the water soluble 1,2-alkanediol is contained in an amount of not less than 3% by weight based on the whole ink composition.

10. The ink composition for ink jet recording according to claim 1, wherein the slightly water soluble 1,2-alkanediol is contained in an amount of not less than 0.3% by weight based on the whole ink composition.

11. The ink composition for ink jet recording according to claim 1, wherein the addition amount ratio of the water soluble 1,2-alkanediol to the slightly water soluble 1,2-alkanediol is 10 1 to 1:1.

12. A method for ink jet recording, comprising the step of ejecting droplets of an ink composition and depositing the droplets onto a recording medium to perform printing, wherein the ink composition is an ink composition for ink jet recording according to claim 1.

13. The method according to claim 12, wherein the recording medium is printing paper having a coating layer with poor ink absorbability.

14. A recorded matter recorded by a method for ink jet recording according to claim 12.

15. An ink composition for ink jet recording, comprising at least a colorant, water, an alkanediol, and a surfactant, wherein the alkanediol comprises a water soluble 1,2-alkanediol and a slightly water soluble 1,2-alkanediol and the surfactant is a polyorganosiloxane, wherein the water soluble 1,2-alkanediol is present in the ink composition in an amount of not less than 3% by weight of the ink composition and the slightly water soluble 1,2-alkanediol is present in the ink composition in an amount of not less than 0.3% by weight of the ink composition, and wherein the polyorganosiloxane surfactant is present in the ink composition in an amount effective to provide the ink composition with better ejection stability, color development or evenness of ink coagulation on printing as compared with the ink composition without the polyorganosiloxane surfactant.

* * * * *